April 16, 1929.  F. MÜLLER  1,709,802
CHAIN
Filed Feb. 10, 1922
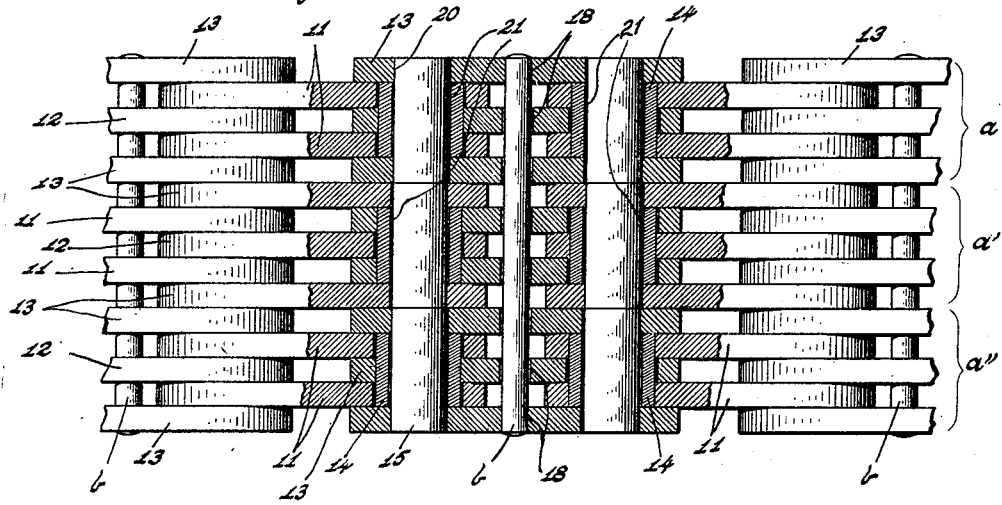
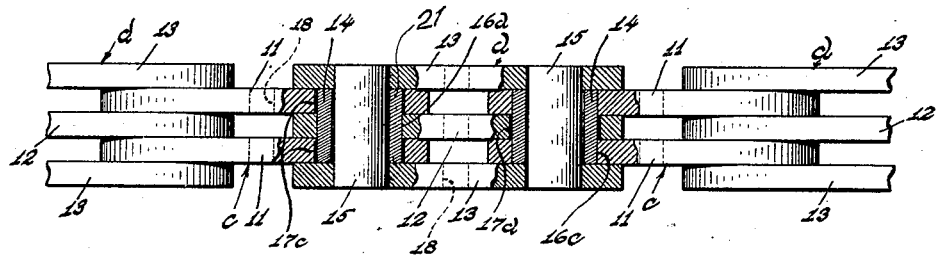
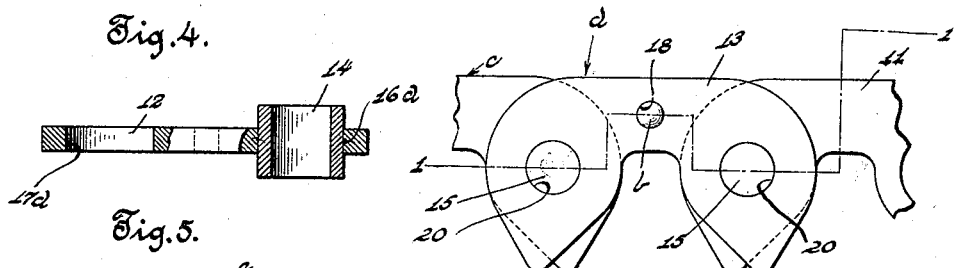
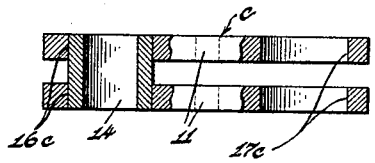
Inventor
Friederich Müller
By His Attorney
T. Clay Lindsey Patented Apr. 16, 1929.

1,709,802

UNITED STATES PATENT OFFICE.

FRIEDERICH MÜLLER, OF HARTFORD, CONNECTICUT, ASSIGNOR TO THE WHITNEY MANUFACTURING COMPANY, OF HARTFORD, CONNECTICUT, A CORPORATION OF CONNECTICUT.

CHAIN.

Application filed February 10, 1922. Serial No. 535,657.

This invention relates generally to drive chains for power transmission, and the novel features thereof find peculiar adaptability in power chains of that type comprising a plurality of pivotally connected links formed of link plates each having a tooth at each end adapted to cooperate with the teeth of the sprocket wheels over which the chain passes.

The object of the invention is to provide a chain having various features of novelty and advantage, and more particularly to provide an improved arrangement wherein wear on the parts will be evenly and uniformly distributed throughout the length of the chain so that the several links will assume a like or equal share of the duty imposed upon the chain, and the chain will run more smoothly and with less noise than heretofore.

A further object of the invention is to provide a chain comprising a plurality of complete units, each unit being so arranged and constructed that wear between the several parts is reduced to a minimum and uniformly distributed, and the units being so connected together that the chain, as a whole, is susceptible of transverse flexure or distortion, and particularly at the pivotal connections between the links, so that the chain may readily accommodate itself to any inaccuracies in the construction or alinement of the sprockets over which the chain passes. The unit chains are simple in construction, the parts may be readily assembled and are securely fastened together in an effective manner, and the chain operates with little or no noise.

In the accompanying drawing, wherein for illustrative purposes I have shown one embodiment which the invention may take, Fig. 1 is a plan view of a chain made up of three units, a portion thereof being shown in longitudinal section on substantially line 1—1 of Fig. 3;

Fig. 2 is a top plan of one of the chain units with parts broken away to illustrate the pivotal connections between the plates of adjacent links;

Fig. 3 is a side elevation showing one complete link and portions of the links adjacent thereto;

Fig. 4 is a longitudinal sectional view showing a plate constituting a part of one of the intervening links and the pivot or sleeve to which this plate is non-rotatably connected, and Fig. 5 is a sectional view through the plates of one of the alternate links and the sleeve to which these plates are non-rotatably connected.

Referring to the drawing in detail, the complete chain is shown in Fig. 1 as comprising three chain units, $a$, $a'$ and $a''$ positioned side by side and suitably connected together, in the present instance, by means of tie pins $b$. It is to be understood that, while I have shown the complete chain in the present instance as comprising but three units, this showing is by way of exemplification only, the number of units employed being dependent upon the width of chain desired.

In Fig. 2, I have designated, for convenience, the alternate links of the chain unit there shown by the letter $c$ and the intervening links by the letter $d$. As there shown, each of the alternate links $c$ comprises a pair of link plates 11, and each of the intervening links $d$ comprises a link plate 12 and a pair of side plates 13. Each of the link plates is provided with teeth adapted to cooperate with the teeth of the sprocket wheels over which the chain passes, as is usual in chains of this type. The side plates likewise may be provided with teeth. The link plates of adjacent links overlap and are pivotally connected together by pivot members, here shown as being in the form of bushings or sleeves 14, located in registering openings in the overlapping ends of the link plates. The side plates 13 are held in place by pins 15 extending through the sleeves 14. It is evident, of course, that the present invention is not limited to any particular number of link plates constituting each link, for the number of these plates in the several links will change according to requirements. Furthermore, in one manner of speaking, a chain unit, such as shown in Fig. 2, constitutes a complete chain, and this unit may be so used to advantage in some instances. Preferably, however, where a wide chain is desired, these units are placed side by side and connected together, as shown in Fig. 1.

In accordance with the present invention, one end of each link plate of the successive links is fixed against rotation relative to one bushing and its other end is loose; that is to say, the front end, for instance, of each link plate is fixed to, so as to turn with, the bushing by means of which the link plate is connected to the next preceding link, and its opposite end loosely receives, and therefore freely swings about, the bushing by means of which the plate is pivotally connected to the next succeeding link. To this end, I have shown in the present illustrative disclosure, the openings $16^c$ and $16^d$ at the corresponding or front ends, for instance, of the link plates 11 and 12, respectively, as being of substantially the same diameter as the bushings so that the bushings have a driving fit in these openings, and the openings $17^c$ and $17^d$ at the other ends of the link plates are of slightly greater diameter than the external diameter of the sleeves so as to loosely receive the latter. With the arrangement just described, it is clear that the effective lengths of the several link plates (i. e., as measured from center to center about which these plates turn as the chain passes about a sprocket) will be uniform at all times in spite of wear between the parts, for a like amount of wear takes place between the edges of the openings $17^c$, $17^d$ and the bushings. This means that while the relation of the links will change slightly owing to wear, this change in relation is uniform throughout the length of the chains and, therefore, each link will share an equal proportion of the duty imposed upon the chain. The final results are that the effectiveness of the chain is maintained at a maximum, the life of the chain is greatly prolonged, and noise is reduced to a minimum. It may be remarked that the link plates of the several links are exactly similar in construction, and thus manufacture of the plates and assembly of the parts is greatly facilitated.

In the present illustrative disclosure, the side plates 13 of the intervening links of a unit chain are provided at each end with openings 20 of like diameter, and the pins 15 have a close driving fit in these openings. The distance from center to center of the openings 20 in each side plate is slightly less than the distance from center to center of the openings in the plate 12 of the intervening links. The result of this arrangement is that when the chain is in operation each of the bushings will have a bearing as at 21 on the pins 15. It will be seen with the arrangement just described that the bushings at alternate ends of the links $d$ rotate relative to and bear against the pins 15, and each of the link plates 12 has a bearing on and rotates at one end about one of the bushings, the result being that wear at each alternate joint is split up, so to speak, or distributed between two sets of bearing surfaces, one set being between the link plates 12 and the external surfaces of the bushings, and the other set between the bushings and pins. At the intervening joints of the unit the wear is between the bushings 14 and two link plates 11. The side plates also serve the function of preventing the link plates from becoming displaced from the pivot bushings.

It will be seen from Fig. 1 that the several units are assembled in staggered relation to form a wide chain, that is to say, the alternate links 11 and the intervening links of adjacent chain units are transversely alined. Also the units are so arranged that the types of joints above described alternate transversely of the chain. For instance, at the lefthand joint shown in section in Fig. 1, reading down the page, the bushing is fixed in the link plate 12. In the next unit the bushing is fixed in the link plates 11 and so on across the width of the chain. The units are connected together, as stated, by the tie pins $b$ which pass through apertures 18 preferably in the centers of the link plates. The side plates have, as shown in Fig. 1, a driving fit on the ends of the tie pins $b$. Preferably, the construction is such that the chain may spring or flex slightly in a transverse direction so as to accommodate itself to inaccuracies, for instance, in the alinement of the sprockets, and to this end the tie pins may be slightly resilient so as to spring or yield, or, if preferred, the apertures 18 which receive these pins may be slightly larger than the pins. When the units are assembled into a composite chain, as shown in Fig. 1, the bushings and pivot pins of the units are normally in substantial alinement transversely of the chain, but each extends but partly across the entire chain. Thus, when the chain passes over the sprocket, the pivot between the adjacent links of one unit may move out of normal alinement with the corresponding pivot of the adjacent unit.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. A chain comprising a series of overlapping link plates, each plate having at each end a tooth adapted to cooperate with the teeth of sprocket wheels, and bushing members pivotally connecting said plates, one end of the plates of one link having a driving fit on said bushing members so as to turn therewith, and the other end of the plates having a loose fit on said bushing members so as to turn thereabout.

2. A chain formed of links having identical link plates having at each end an integral tooth and provided at their ends with openings, the openings at one end of the plates being larger than those at the other end of the plates, and pivot bushings having a driving fit in the smaller openings and a loose fit in the larger ones.

3. A chain comprising a series of overlapping link plates, each plate having at each end a tooth adapted to cooperate with the teeth of sprocket wheels, bushings pivotally connecting said plates, one end of the plates of each link being fixed to a bushing so as to turn therewith and the other end of the plates having their ends loose on a bushing so as to turn thereabout, and means for holding said link plates against displacement from said bushings.

4. A chain comprising a series of overlapping link plates, of the character described, bushings pivotally connecting the same, one end of the plates of one link being fixed to a bushing so as to turn therewith and the other end of the plates having a loose engagement on the bushing so as to turn thereabout, pivot pins positioned in said bushings, and means for holding said pins in place.

5. A chain comprising a series of overlapping link plates, bushings pivotally connecting the same, the corresponding ends of said plates being fixed to said bushings so as to turn therewith, and the other ends of said plates being loose on said bushings so as to turn thereabout, pins positioned in said bushings, and side plates connecting said pins in pairs, said pins being non-rotatable relative to said side plates.

6. A chain comprising a series of overlapping link plates of the character described, bushings pivotally connecting the overlapping ends of adjacent plates, and pivot pins positioned in said bushings, each of said bushings having a plate rotatable therearound and each alternate bushing being rotatable around one of said pins.

7. A chain comprising a series of overlapping link plates, bushings pivotally connecting the overlapping ends of adjacent plates, each of said plates having one end connected to a bushing so as to turn therewith and having its other end loose on a bushing so as to turn thereabout, pivot pins positioned in said bushings, and side plates connecting said pins in such relation that each alternate one of said bushings is rotatable about and has a bearing on its associated pin.

8. A chain comprising a series of links formed of link plates of the character described, bushings pivotally connecting the same, a pivot pin in each bushing, and side plates connecting said pins in pairs with the distance between the centers of the pins of each pair slightly less than the difference between the centers of the bushings in which these pins are mounted.

9. A chain formed of links having link plates provided at their opposite ends with openings, the openings at corresponding ends of said plates being larger than those at the other ends, bushings having a driving fit in the smaller openings and a loose fit in the larger ones, pivot pins positioned in said bushings, and side plates having openings in which the ends of said pins have a driving fit, the distance between the centers of the openings in said side plates being less than the distance between the centers of the openings of said link plates.

10. A chain formed of a plurality of unit chains; each of said unit chains comprising a series of links formed of link plates, bushings pivotally connecting the link plates of adjacent links, a pin positioned in each of said bushings and side plates for every other link and to which said pins are non-rotatably connected; said units being positioned side by side with the side plates of one unit in staggered relation to those of an adjacent unit; and pins passing freely through the link plates and having their ends secured in the side plates of the marginal units.

11. A chain formed of a plurality of unit chains placed side by side; each of said unit chains comprising a series of overlapping link plates and bushing members connecting the same, each end of the plates of one link being fixed to a bushing member so as to rotate therewith, and the plates of the adjacent links having their ends loose on a bushing member so as to turn thereabout; and means for connecting said unit chains together.

12. A chain comprising a plurality of unit chains; each of said unit chains being composed of a series of overlapping link plates and members pivotally connecting the same, the ends of the plates of one link being fixed to said bushing members so as to turn therewith, and the plates of the adjacent links being loose on said members so as to turn thereabout; and means for securing said unit chains together.

13. A chain comprising a plurality of unit chains; each of said unit chains being composed of a series of link plates and bushings pivotally connecting the same, the ends of the plates of one link being fixed to said bushings so as to turn therewith, and the plates of the adjacent links being loose on said bushings so as to turn thereabout, a separate pivot pin positioned in each of said bushings and means for securing said pins in place; and means spaced from said pins for securing said unit chains together.

14. A built-up chain comprising a plurality of chain units; each of said units being composed of a series of link plates and bushings pivotally connecting the same, the ends of the plates of one link being fixed to said bushings so as to turn therewith, and the plates of the adjacent links being loose on said bushings so as to turn thereabout, a pin positioned in each of said bushings and side plates connecting said pins in pairs; said unit chains being positioned side by side with the side plates of adjacent units in staggered relation; and tie pins passing through said link plates and anchored in said side plates, said tie pins being arranged to permit the built-up chain to flex transversely.

FRIEDERICH MÜLLER.